United States Patent
Hardenburg

(10) Patent No.: US 7,341,615 B2
(45) Date of Patent: Mar. 11, 2008

(54) FILTER WITH LOCATING FEATURE

(75) Inventor: Robert M. Hardenburg, Lake Orion, MI (US)

(73) Assignee: Automotive Systems Laboratory, Inc., Armada, MI (US)

( * ) Notice: Subject to any disclaimer, the term of this patent is extended or adjusted under 35 U.S.C. 154(b) by 417 days.

(21) Appl. No.: 10/976,119

(22) Filed: Oct. 28, 2004

(65) Prior Publication Data

US 2005/0138909 A1 Jun. 30, 2005

Related U.S. Application Data

(60) Provisional application No. 60/515,241, filed on Oct. 29, 2003.

(51) Int. Cl.
*B01D 46/00* (2006.01)
*B60R 21/264* (2006.01)

(52) U.S. Cl. ............ 55/525; 55/385.3; 280/728.1; 280/736; 280/740; 280/741; 422/305

(58) Field of Classification Search .......... 55/385.3, 55/525, 498; 280/728.1, 736, 737, 738, 740, 280/741, 742, 743.1; 422/167, 305
See application file for complete search history.

(56) References Cited

U.S. PATENT DOCUMENTS

| | | | | |
|---|---|---|---|---|
| 3,985,076 A * | 10/1976 | Schneiter et al. | ........... | 102/531 |
| 4,547,342 A * | 10/1985 | Adams et al. | ............. | 422/166 |
| 4,886,293 A * | 12/1989 | Weiler et al. | ............... | 280/736 |
| 5,204,068 A * | 4/1993 | O'Loughlin et al. | ........ | 422/180 |
| 5,400,867 A * | 3/1995 | Muller et al. | ............... | 180/268 |
| 5,632,793 A | 5/1997 | Haggard | ...................... | 55/498 |
| 5,673,483 A | 10/1997 | Hock et al. | ............. | 29/896.62 |
| 5,683,106 A * | 11/1997 | Fulmer | ...................... | 280/741 |
| 5,829,785 A * | 11/1998 | Jordan et al. | ............... | 280/741 |
| 5,849,054 A | 12/1998 | Fujisawa | ...................... | 55/486 |
| 5,876,062 A * | 3/1999 | Hock | ......................... | 280/736 |
| 5,938,236 A * | 8/1999 | Tanaka et al. | ............... | 280/741 |
| 6,029,995 A * | 2/2000 | Fink | ........................... | 280/737 |
| 6,068,293 A * | 5/2000 | Shirk et al. | ................. | 280/737 |
| 6,116,643 A | 9/2000 | Katsuda et al. | ............. | 280/741 |
| 6,196,581 B1 * | 3/2001 | Katsuda et al. | ............. | 280/736 |
| 6,277,166 B2 | 8/2001 | Zettel et al. | ............... | 55/385.3 |

(Continued)

*Primary Examiner*—Duane Smith
*Assistant Examiner*—Robert A Clemente
(74) *Attorney, Agent, or Firm*—L.C. Begin & Associates, PLLC

(57) ABSTRACT

A filter (10) and an inflator assembly (15) for use in an inflatable vehicle passenger restraint system. The inflator assembly (15) includes an inflator housing (70) having a wall (71), a combustion chamber (72) formed in an interior of the housing (70), and a gas generant composition positioned in the combustion chamber (72) and ignitable to provide inflation gas to the inflatable occupant restraint system. The filter (10) is positioned intermediate apertures (73) in the combustion chamber (72) and apertures (19) in the inflator housing wall (71). The filter (10) includes a filter body (11) spaced apart from the housing wall (71) and at least one continuous lip (12) extending from the filter body (11). The lip (12) has a peripheral edge (75) that abuts the housing wall (71) over substantially the entire perimeter of the peripheral edge (75). The lip (12) aids in positioning the filter (10) within an inflator housing (70) and in maintaining the position of the filter (10) within the housing (70) during passage of combustion gases through the filter (10).

39 Claims, 3 Drawing Sheets

U.S. PATENT DOCUMENTS

| | | |
|---|---|---|
| 6,283,505 B1 * | 9/2001 | Saso et al. .................. 280/741 |
| 6,409,214 B2 * | 6/2002 | Katsuda et al. ............. 280/741 |
| 6,419,263 B1 | 7/2002 | Busgen et al. .............. 280/733 |
| 6,431,598 B2 * | 8/2002 | Saso et al. .................. 280/741 |
| 6,474,685 B1 * | 11/2002 | Meixner et al. ............ 280/741 |
| 6,695,345 B2 * | 2/2004 | Katsuda et al. ............. 280/736 |
| 6,749,219 B2 * | 6/2004 | Edwards, II et al. ....... 280/741 |
| 6,787,031 B2 * | 9/2004 | Van Pelt et al. ............ 210/232 |
| 6,840,977 B1 * | 1/2005 | Fukunaga et al. ........... 55/526 |
| 6,890,002 B1 * | 5/2005 | Suehiro et al. ............. 280/741 |
| 6,983,956 B2 * | 1/2006 | Canterberry et al. ........ 280/741 |
| 6,997,477 B2 * | 2/2006 | Quioc ........................ 280/741 |
| 7,052,040 B2 * | 5/2006 | Matsuda et al. ............ 280/741 |
| 7,052,041 B2 * | 5/2006 | McCormick ................ 280/741 |
| 2001/0028164 A1 * | 10/2001 | Saso et al. .................. 280/741 |
| 2004/0124618 A1 * | 7/2004 | Schonhuber et al. ........ 280/736 |
| 2005/0035579 A1 * | 2/2005 | Canterberry et al. ........ 280/741 |
| 2005/0104348 A1 * | 5/2005 | McCormick ................ 280/741 |
| 2005/0225064 A1 * | 10/2005 | Suehiro et al. ............. 280/741 |
| 2006/0022443 A1 * | 2/2006 | Stevens et al. ............. 280/736 |
| 2006/0103122 A1 * | 5/2006 | McFarland ................. 280/736 |
| 2007/0001437 A1 * | 1/2007 | Wall et al. .................. 280/736 |

* cited by examiner

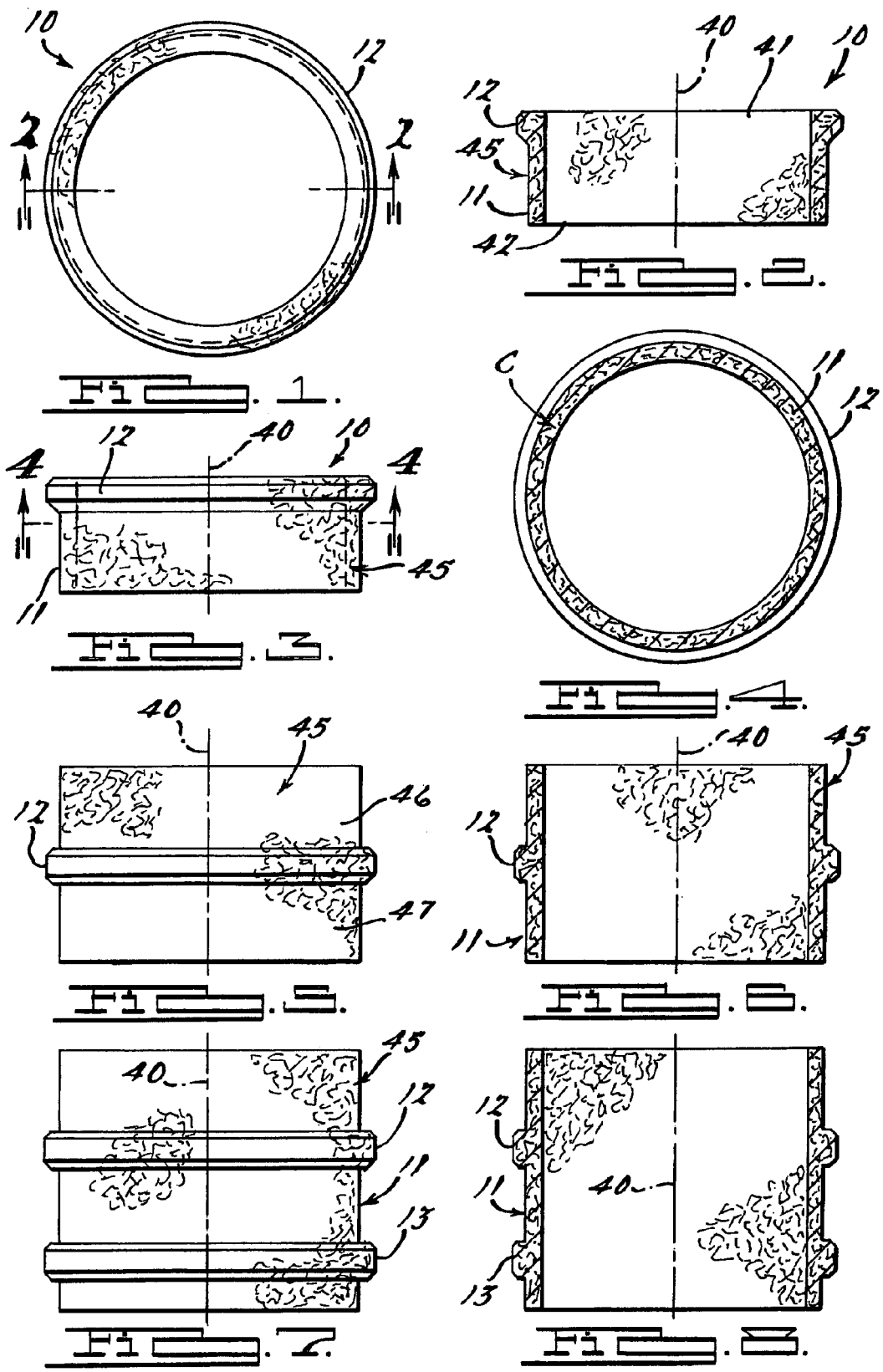

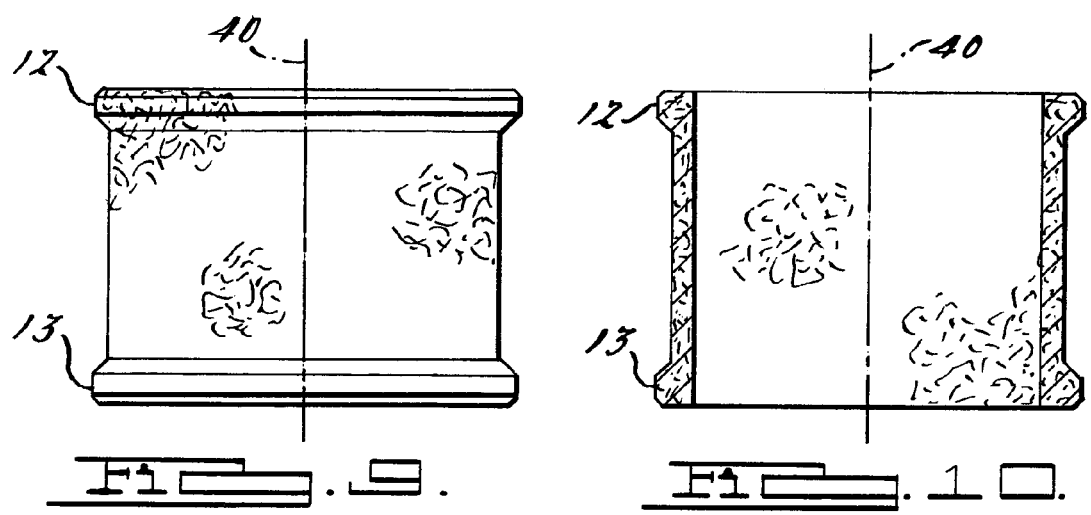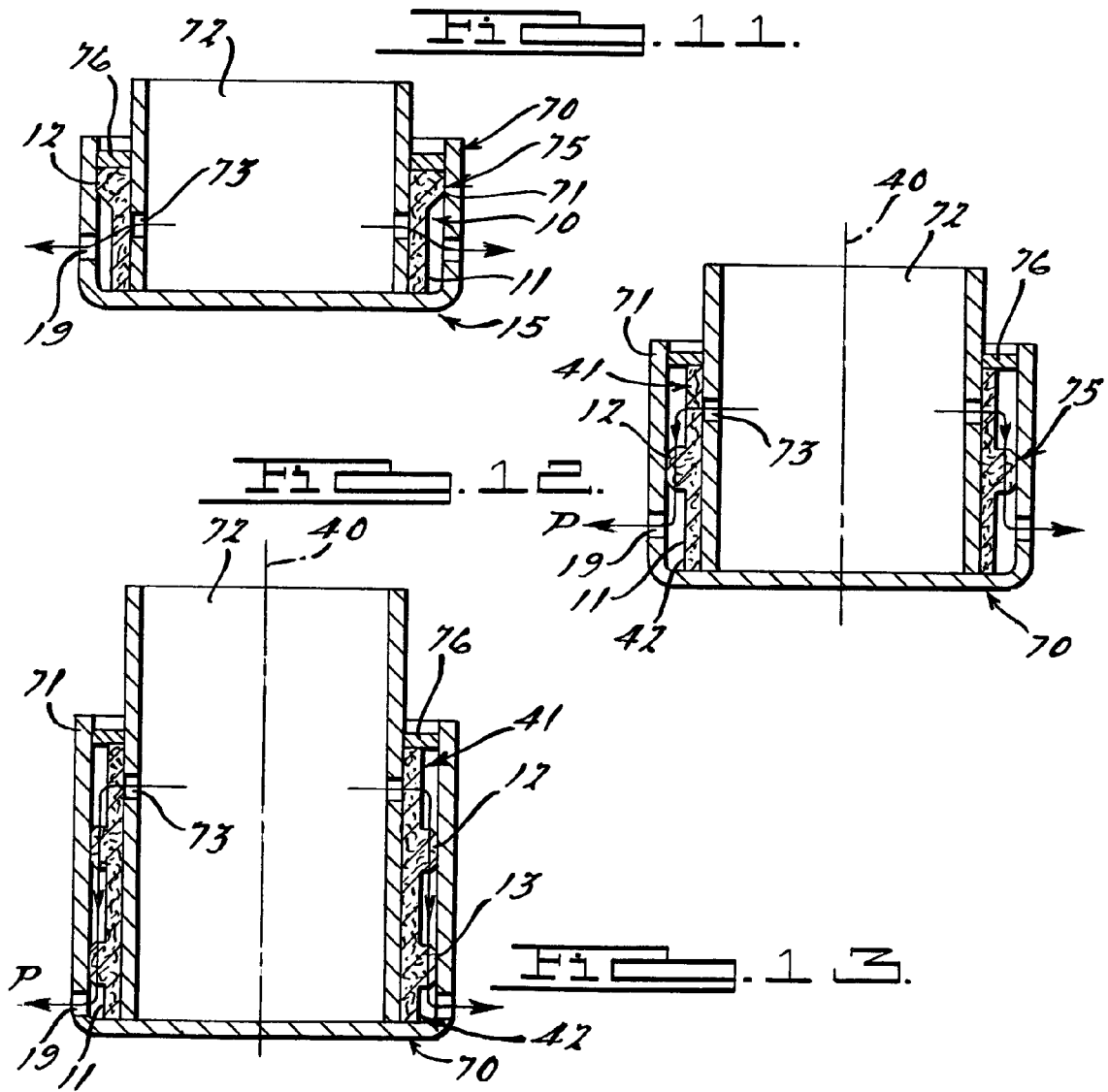

FILTER WITH LOCATING FEATURE

CROSS REFERENCE TO RELATED APPLICATIONS

This application claims the benefit of provisional application Ser. No. 60/515,241, filed on Oct. 29, 2003.

BACKGROUND OF THE INVENTION

The present invention relates to filters, and, more particularly, to filters for filtering combustion gases generated in a pyrotechnic inflatable passenger restraint system for a motor vehicle.

Concerns with passenger safety in motor vehicles have led to the development of inflatable vehicle occupant safety systems. One example of such a system is the vehicle "airbag", a passive restraint and protection system comprising a bag or pillow-like bladder that is inflated in an extremely short period of time using compressed or chemically-generated gas to fill the bag. The inflated bag is disposed or deployed between the front or side of the passenger and an interior portion of the vehicle's passenger compartment.

In current airbag designs, the gas generated escapes a combustion chamber and is propelled towards the airbag, so that the gases and any particulates would impinge on the bag itself if no filter were present. If no measures are taken to ameliorate the degradative effects of the combustion gases, the gases and/or particulates may penetrate the bag, potentially causing failure of the bag and possible injury to a passenger. Consequently, current airbag inflators often contain a filter for filtration of solids and cooling of combustion gases. Current filtering devices may comprise layers of metal screens of various mesh sizes and one or more layers of a non-combustible fibrous material packed between the screens. The efficiency of this type of filter is dependent upon how tightly the material is packed; a tighter packing leads to more efficient filtering but also to a higher pressure drop. There is also a problem with quality control in the mass fabrication of such screen-mat composites with respect to ensuring a uniform pressure drop across any given filter.

Yet another problem in designing inflator filtration devices is that, as the filter becomes clogged, the pressure drop across the filter increases. Accordingly, the mechanical stresses on the filter are increased, and combustion gases and particulates move through the filter at a higher velocity, necessitating improved filter strength and toughness to withstand the higher flow rate, pressure drop, and particulate velocity into the filter. The filter must be positionally stabilized against the effects of such stresses.

SUMMARY OF THE INVENTION

The present invention provides a filter for use in an inflator assembly of an inflatable passenger restraint system. The filter includes a body having an axis extending therethrough, a first end, and a second end opposite the first end. At least one continuous lip extends from the filter body and encloses an area defined by a cross-section of the filter body taken substantially perpendicular to the axis. Depending on its location on the filter body, the lip may also partition a peripheral surface of the body into a number of separate, non-contiguous regions.

An inflator assembly for an inflatable occupant restraint system is also provided. The inflator assembly includes an inflator housing having a wall, a combustion chamber formed in an interior of the housing, and a gas generant composition positioned in the combustion chamber and ignitable to provide inflation gas to the inflatable occupant restraint system. A filter is positioned intermediate a first group of apertures located in the combustion chamber and a second group of apertures located in the inflator housing wall. The filter has a body spaced apart from the housing wall and at least one continuous lip extending from the body. The lip has a peripheral edge that abuts the housing wall over substantially the entire perimeter of the peripheral edge. The lip aids in positioning the filter within an inflator housing and in maintaining the position of the filter within the housing during passage of combustion gases through the filter.

BRIEF DESCRIPTION OF THE DRAWINGS

In the drawings illustrating embodiments of the present invention:

FIG. 1 is a top view of a first embodiment of a filter in accordance with the present invention;

FIG. 2 is a cross-sectional side view of the filter of FIG. 1;

FIG. 3 is a side view of the filter of FIG. 1;

FIG. 4 is a cross-sectional bottom view of the filter of FIG. 1;

FIG. 5 is a side view of a second embodiment of a filter in accordance with the present invention;

FIG. 6 is a cross-sectional side view of the filter of FIG. 5;

FIG. 7 is a side view of a third embodiment of a filter in accordance with the present invention;

FIG. 8 is a cross-sectional side view of the filter of FIG. 7;

FIG. 9 is a side view of a fourth embodiment of a filter in accordance with the present invention;

FIG. 10 is a cross-sectional side view of the filter of FIG. 9;

FIG. 11 is a cross-sectional side view of a first embodiment of an inflator assembly in accordance with the present invention;

FIG. 12 is a cross-sectional side view of a second embodiment of an inflator assembly in accordance with the present invention;

FIG. 13 is a cross-sectional side view of a third embodiment of an inflator assembly in accordance with the present invention.

DETAILED DESCRIPTION

Figure 14:
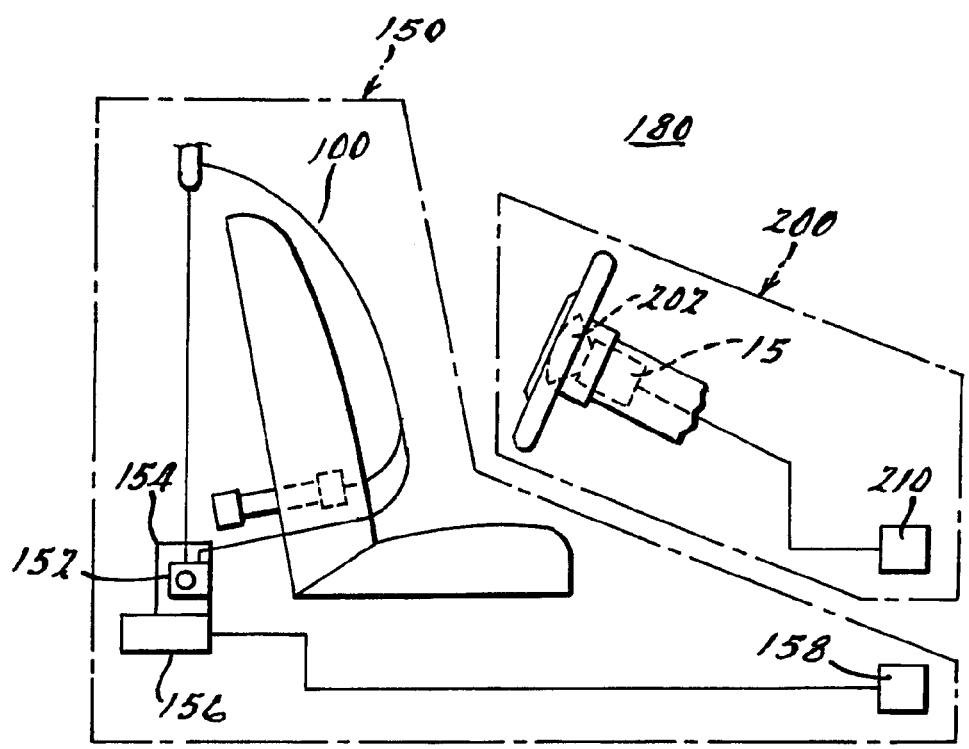
FIG. 14 is a schematic view of an airbag system and a vehicle occupant restraint system incorporating a filter in accordance with the present invention.

The present invention includes a filter for filtering combustion gases in a pyrotechnic inflatable restraint system for a motor vehicle. The filter has a positioning feature that orients the filter during assembly with a gas generator or inflator, and assists in maintaining the filter in an appropriate position during inflator activation.

FIGS. 1-4 show one embodiment of a filter 10 according to the present invention. In the embodiment shown, filter 10 has a body 11 formed from a metallic wire mesh with a first end 41 and a second end 42 opposite first end 41. An axis 40 extends through body 11. In this embodiment, positioning feature 12 comprises at least one lip formed from a metallic wire mesh and extending from a peripheral surface 45 of filter body 11 to enclose an area C (FIG. 4) defined by a cross-section of body 11 taken substantially perpendicular to longitudinal axis 40, along line 4-4 (FIG. 3).

Referring to FIGS. 1-10, lip 12 may be positioned at either end of filter body 11 or intermediate first end 41 and second end 42 of body 11. A second lip 13 (FIGS. 7-10) may also extend from body 11. Second lip 13 may be positioned at an opposite end 42 of body 11 from first lip 12. Alternatively, first lip 12 and second lip 13 may be spaced apart and positioned intermediate the first and second ends of body 11.

In the embodiment shown in FIGS. 5 and 6, lip 12 is continuous and extends around the periphery of body 11, thereby partitioning surface 45 into separate, non-contiguous regions 46 and 47. For purposes of this disclosure, the term "non-contiguous" means that the regions into which surface 45 are partitioned do not touch. Referring to FIGS. 7 and 8, in alternative embodiments, additional lips may extend from surface 45, partitioning the surface into a number of separate, non-contiguous regions equal to n+1, where n is equal to the number of continuous lips extending from peripheral surface 45. Referring again to FIGS. 1-4, in a particular embodiment, filter body 11 is substantially cylindrical with lip 12 extending radially outwardly from peripheral surface 45 of body 11. Alternatively, filter body 11 and lip 12 may be formed into other shapes depending on the spatial requirements of the inflator in which filter 10 is used.

Lip 12 may be formed integral with filter body 11, for example by deforming a portion of peripheral surface 45 or by outwardly bending an edge of the end of filter body 11 (FIGS. 1-4). In addition, lip 12 may be woven into filter body 11 during fabrication of the body. Alternatively, lip 12 may be formed separately from filter body 11 and then welded, bonded, or otherwise secured to body 11 in a desired position.

Suitable wire mesh material for fabricating filter body 11 and/or lip 12 is available, for example, from Wayne Wire Cloth Products, Inc., of Bloomfield Hills, Mich. Other materials (for example, plastic) or other structural configurations (for example, a planar grating) may be used in place of a metallic wire mesh when fabricating filter body 11 or lip 12. The materials and structures used for body 11 and lip 12 may depend of such factors as the temperature and composition of the combustion gases to be filtered, projected pressures of the combustion gases, and the sizes of the combustion particulates to be filtered.

The mesh forming body 11 and lip 12 has a substantially constant density, thus minimizing the risk that combustion gases will follow a path of reduced resistance rather than passing uniformly through the filter body. For example, one end of an existing cylindrical wire mesh filter can be compressed and bent outwardly to form lip 12, yielding a portion of the filter having both the desired shape and uniform density of the mesh, Referring now to FIGS. 11-13, FIG. 11 shows a filter in accordance with the present invention positioned within an exemplary inflator assembly 15. Inflator assembly 15 is used in an inflatable occupant restraint system in a motor vehicle. Inflator assembly 15 is shown for illustrative purposes as a cylindrical inflator, contemplated primarily for driver side use. However, it should be appreciated that the present invention is applicable to alternative inflator designs.

Inflator assembly 15 includes an inflator housing 70 having a wall 71 with at least one aperture 19 formed therein to enable fluid communication between an interior of housing 70 and an exterior of the housing. A combustion chamber 72 is formed in an interior of housing 70. Chamber 72 includes at least one aperture 73 formed therein to enable fluid communication between an interior of the combustion chamber and an exterior of the chamber. A gas generant composition (not shown) is positioned in combustion chamber 72 and is ignitable to provide inflation gas to the inflatable occupant restraint system. Filter 10 is positioned intermediate the aperture (or apertures) 73 in combustion chamber 72 and the aperture (or apertures) 19 in inflator housing 70. Gases generated by the combustion of the gas generant in chambers 72 are directed outwardly, passing through filter 10 and exiting inflator housing 71 via apertures 19.

As seen in FIG. 11, filter body 11 is spaced apart from housing wall 71, and a peripheral edge 75 of lip 12 abuts housing wall 71 over substantially the entire perimeter of the peripheral edge, to assist in positioning filter 10 within inflator housing 71 and maintaining the position of the filter within the housing during passage of a fluid through the filter. In an embodiment where filter body 11 and inflator housing 70 are substantially cylindrical, lip 12 may be annular and may be used to help coaxially position filter body 11 and inflator housing 70. Peripheral edge 75 of lip 12 may engage housing wall 71 in an interference fit to aid in securing filter 10 within housing 70. A retaining disk 76 may also be secured to housing 70 (using, for example, an interference fit) to aid in retaining filter 10 within housing 70.

Lip 12 enhances the spatial stability of filter 10 within inflator housing 70 and thus minimizes the phenomenon known in the art as "blow-by", wherein gases exiting the combustion chamber are forced around the filter rather than through it, often by deforming a portion of the filter or providing a path of lesser fluid resistance due to a relatively lower wire density. Enhanced spatial stability of the filter also enables a more uniform, predictable rate of ejection of combustion gases from housing apertures 19. Lip 12 thus assists in minimizing variability of the inflator ballistics, enhances uniformity of gas ejection upon activation, and provides a degree of control over the inflator internal pressure. Further, the thickness of the wire mesh along lip 12 in a direction extending outward from combustion chambers 72 is greater than the wall thickness of filter body 11. Consequently, the lip portion of filter 10 provides greater resistance than other parts of the filter to fluid passage in an outward direction from combustion chambers 72. Accordingly, a relatively greater proportion of the combustion gases are directed through portions of filter body 11 not bounded by lip 12.

Referring to FIG. 12, in a particular embodiment of the present invention, lip 12 is positioned intermediate first end 41 and second end 42 of filter body 11, and apertures 73 formed in combustion chamber 72 are positioned intermediate the first and second ends of the filter body. In addition, apertures 19 in housing wall 71 are positioned so that lip 12 extending from filter body 11 intersects a fluid flow path (represented by arrow P) extending between combustion chamber apertures 73 and housing wall apertures 19. In this embodiment, combustion gases exiting combustion chamber 72 are forced to pass through a wall of filter body 11 and also through lip 12 prior to exiting the inflator via housing apertures 19. This enables lip 12 to act as additional filtration layer, thereby increasing the effective thickness of the filter without increasing its overall thickness. Lip 12 thus serves the dual function of filtration and of positioning filter 10 within inflator housing 70.

Referring to FIG. 13, two or more additional layers of filtration may be provided by appropriate positioning of lips 12 and 13, combustion chamber apertures 73, and inflator housing apertures 19. Provision of additional lips extending from filter body 11 and abutting housing wall 71 also enhances positional stability of filter 10 within inflator housing 70.

An inflator incorporating any of the filter embodiments described above may be incorporated into an airbag system 200, as seen in FIG. 14. Airbag system 200 includes at least one airbag 202 and an airbag inflator 15 coupled to airbag 202 so as to enable fluid communication with an interior of the airbag for inflating the airbag in the event of a collision. Examples of inflators which may be incorporated into airbag system 200 are described in U.S. Pat. Nos. 6,752,421 and 5,806,888, both incorporated herein by reference. The inflator includes an embodiment of filter 10 as described above, for filtering combustion gases generated by the inflator. For example, as seen in FIGS. 1-4, filter 10 may comprise a body 11 having an axis 40 extending therethrough, a first end 41, a second end 42 opposite first end 41, and at least one lip 12 extending from filter body 11 and enclosing an area defined by a cross-section of the body taken substantially perpendicular to axis 40. Airbag system 200 may also be in communication with a crash event sensor 210 including a known crash sensor algorithm that signals actuation of airbag system 200 via, for example, activation of airbag inflator 15 in the event of a collision.

Referring to FIG. 14, airbag system 200 may also be incorporated into a broader, more comprehensive vehicle occupant restraint system 180 including additional elements such as a safety belt assembly 150. FIG. 14 shows a schematic diagram of one exemplary embodiment of such a restraint system.

Safety belt assembly 150 includes a safety belt housing 152 and a safety belt 100 in accordance with the present invention extending from housing 152. A safety belt retractor mechanism 154 (for example, a spring-loaded mechanism) may be coupled to an end portion of the belt. In addition, a safety belt pretensioner 156 may be coupled to belt retractor mechanism 154 to actuate the retractor mechanism in the event of a collision. Typical seat belt retractor mechanisms which may be used in conjunction with the safety belt embodiments of the present invention are described in U.S. Pat. Nos. 5,743,480, 5,553,803, 5,667,161, 5,451,008, 4,558,832 and 4,597,546, incorporated herein by reference. Illustrative examples of typical pretensioners with which the safety belt embodiments of the present invention may be combined are described in U.S. Pat. Nos. 6,505,790 and 6,419,177, incorporated herein by reference.

Safety belt system 150 may be in communication with a crash event sensor 158 (for example, an inertia sensor or an accelerometer) including a known crash sensor algorithm that signals actuation of belt pretensioner 156 via, for example, activation of a pyrotechnic igniter (not shown) incorporated into the pretensioner. U.S. Pat. Nos. 6,505,790 and 6,419,177, previously incorporated herein by reference, provide illustrative examples of pretensioners actuated in such a manner.

It will be understood that the foregoing description of an embodiment of the present invention is for illustrative purposes only. As such, the various structural and operational features herein disclosed are susceptible to a number of modifications commensurate with the abilities of one of ordinary skill in the art, none of which departs from the scope of the present invention as defined in the appended claims.

The invention claimed is:

1. A filter comprising:
 a body having an axis extending therethrough, a first end, and a second end opposite the first end; and
 at least two lips formed from a filter material, the lips extending from the filter body and enclosing an area defined by a cross-section of the body taken substantially perpendicular to the axis.

2. The filter of claim 1 wherein the body is formed from a wire mesh.

3. The filter of claim 2 wherein the wire mesh is a metallic wire mesh.

4. The filter of claim 2 wherein at least one lip is formed from a wire mesh.

5. The filter of claim 4 wherein the at least one lip is woven into the body during fabrication of the body.

6. The filter of claim 4 wherein at least one of the lips and the body have substantially equal densities.

7. The filter of claim 4 wherein the body has a substantially uniform density and at least one of the lips has a substantially uniform density.

8. The filter of claim 1 wherein the body is substantially cylindrical.

9. The filter of claim 8 wherein each of the lips extends radially outwardly from a peripheral surface of the body.

10. The filter of claim 1 wherein at least one lip is positioned at an end of the filter body.

11. The filter of claim 10 wherein the second continuous lip is positioned at the other end of the filter body.

12. The filter of claim 1 wherein at least one lip is positioned intermediate the first and second ends of the body.

13. The filter of claim 1 wherein the lips are spaced apart and positioned intermediate the first and second ends of the body.

14. The filter of claim 1 wherein at least one of the lips is formed from a wire mesh.

15. The filter of claim 14 wherein the wire mesh is a metallic wire mesh.

16. The filter of claim 1 wherein at least one lip is formed integral with the body.

17. The filter of claim 16 wherein the at least one lip is formed by deforming a portion of a peripheral surface of the body.

18. The filter of claim 16 wherein the at least one lip is formed by outwardly bending an edge of the end of the filter body.

19. An inflator assembly for an inflatable occupant restraint system in a motor vehicle, the inflator comprising:
 an inflator housing having a wall with at least one aperture formed therein to enable fluid communication between an interior of the housing and an exterior of the housing;
 a combustion chamber formed in an interior of the housing and including at least one aperture formed therein te enable fluid communication between an interior of the combustion chamber and an exterior of the chamber;
 a gas generant composition positioned in the combustion chamber and ignitable to provide inflation gas to the inflatable occupant restraint system; and
 a filter positioned intermediate the at least one aperture in the combustion chamber and the at least one aperture in the inflator housing, the filter having a body spaced apart from the housing wall and at least one lip extending from the body, the at least one lip having a peripheral edge that abuts the housing wall over substantially the entire perimeter of the peripheral edge for positioning the filter within a housing and maintaining the position of the filter within the housing during passage of a fluid through the filter, and a retaining disk secured to the housing to retain the filter within the housing, wherein a wall of the combustion chamber separates the gas generant from the filter.

20. The inflator assembly of claim 19 wherein the retaining disk engages the housing in an interference fit.

21. An inflator assembly for an inflatable occupant restraint system in a motor vehicle, the inflator comprising:
an inflator housing having a wall with at least one aperture formed therein to enable fluid communication between an interior of the housing and an exterior of the housing;
a combustion chamber formed in an interior of the housing and including at least one aperture formed therein to enable fluid communication between an interior of the combustion chamber and an exterior of the chamber;
a gas generant composition positioned in the combustion chamber and ignitable to provide inflation gas to the inflatable occupant restraint system; and
a filter positioned intermediate the at least one aperture in the combustion chamber and the at least one aperture in the inflator housing, the filter having a body spaced apart from the housing wall and at least one lip extending from the body, the at least one lip having a peripheral edge that abuts the housing wall over substantially the entire perimeter of the peripheral edge for positioning the filter within a housing and maintaining the position of the filter within the housing during passage of a fluid through the filter,
wherein a wall of the combustion chamber separates the gas generant from the filter, and wherein the filter body has a first end and a second end opposite the first end, the at least one lip is positioned intermediate the first and second ends of the filter body, the at least one aperture formed in the combustion chamber is positioned intermediate the first and second ends of the filter body, and the at least one aperture in the housing wall is positioned so that the at least one lip extending from the filter body intersects a fluid flow path extending between the at least one combustion chamber aperture and the at least one housing wall aperture.

22. An inflator assembly for an inflatable occupant restraint system in a motor vehicle, the inflator comprising:
an inflator housing having a wall with at least one aperture formed therein to enable fluid communication between an interior of the housing and an exterior of the housing;
a combustion chamber formed in an interior of the housing and including at least one aperture formed therein to enable fluid communication between an interior of the combustion chamber and an exterior of the chamber;
a gas generant composition positioned in the combustion chamber and ignitable to provide inflation gas to the inflatable occupant restraint system; and
a filter positioned intermediate the at least one aperture in the combustion chamber and the at least one aperture in the inflator housing, the filter having a body spaced apart from the housing wall and at least one lip extending from the body, the at least one lip having a peripheral edge that abuts the housing wall over substantially the entire perimeter of the peripheral edge for positioning the filter within a housing and maintaining the position of the filter within the housing during passage of a fluid through the filter, wherein a wall of the combustion chamber separates the gas generant from the filter, wherein the filter body has a first end and a second end opposite the first end, and wherein a pair of lips extends from the filter body, the lips being spaced apart and positioned intermediate the first and second ends of the body.

23. The inflator assembly of claim 22 wherein the at least one aperture formed in the combustion chamber is positioned intermediate an end of the filter body and one of the lips extending from the filter body, and the at least one aperture in the housing wall is positioned so that both of the lips extending from the filter body intersect a fluid flow path extending between the at least one combustion chamber aperture and the at least one housing wall aperture.

24. An inflator assembly for an inflatable occupant restraint system in a motor vehicle, the inflator comprising:
an inflator housing having a wall with at least one aperture formed therein to enable fluid communication between an interior of the housing and an exterior of the housing;
a combustion chamber formed in an interior of the housing and including at least one aperture formed therein to enable fluid communication between an interior of the combustion chamber and an exterior of the chamber;
a gas generant composition positioned in the combustion chamber and ignitable to provide inflation gas to the inflatable occupant restraint system; and
a filter positioned intermediate the at least one aperture in the combustion chamber arid the at least one aperture in the inflator housing, the filter having body spaced apart from the housing wall and at least one lip extending from the body, the at least one lip having a peripheral edge abuts the housing wall over substantially the entire perimeter of the peripheral edge for positioning the fitter within a housing and maintaining the position of the filter within the housing during passage of a fluid through the filter,
wherein a wall of the combustion chamber separates the gas generant from the filter, and wherein the filter has two lips formed from a filter material.

25. A wire mesh filter for an inflator in an inflatable occupant restraint system, comprising:
a substantially cylindrical body having a first end and a second end opposite the first end; and at least two continuous, annular lips formed from a filter material and extending radially outwardly from a peripheral surface of the body.

26. The filter of claim 25 wherein the filter is formed from a metallic wire mesh.

27. The filter of claim 25 wherein at least one lip is positioned at the first end of the filter body.

28. The filter of claim 27 wherein another lip is positioned at the second end of the filter body.

29. The filter of claim 25 wherein at least one lip is positioned intermediate the first and second ends of the body.

30. The filter of claim 25 wherein the at least two lips are spaced apart and positioned intermediate the first and second ends of the body.

31. The filter of claim 25 wherein at least one lip is formed integral with the body.

32. The filter of claim 31 wherein the at least one lip is formed by deforming a portion of a peripheral surface of the body.

33. The filter of claim 31 wherein the at least one lip is formed by outwardly bending an edge of the end of the filter body.

34. The filter of claim 25 wherein at least one lip is formed from a wire mesh.

35. The filter of claim 34 wherein the at least one lip is woven into the wire mesh of the body during fabrication of the body.

36. The filter of claim 34 wherein the at least one lip and the body have substantially equal densities.

37. The filter of claim 34 wherein the body has a substantially uniform density and the at least one lip has a substantially uniform density.

38. An airbag system comprising:
at least one airbag; and
an airbag inflator coupled to the airbag so as to enable fluid communication with an interior of the airbag for inflating the airbag in the event of a collision, the inflator including a filter for filtering combustion gases generated by the inflator, the filter comprising a body having an axis extending therethrough, a first end, and a second end opposite the first end, and at least two lips formed from a filter material, the lips extending from the filter body and enclosing an area defined by a cross-section of the body taken substantially perpendicular to the axis.

39. A vehicle occupant restraint system comprising:
an airbag system including at least one airbag and an airbag inflator coupled to the airbag so as to enable fluid communication with an interior of the airbag for inflating the airbag in the event of a collision, the inflator including a filter for filtering combustion gases generated by the inflator, the filter comprising a body having an axis extending therethrough, a first end, and a second end opposite the first end, and at least two lips (termed from a filter material, the lips extending from the filter body and enclosing an area defined by a cross-section of the body taken substantially perpendicular to the axis;
a safety belt assembly including a housing and a safety belt extending from the housing.

* * * * *

UNITED STATES PATENT AND TRADEMARK OFFICE
CERTIFICATE OF CORRECTION

PATENT NO.         : 7,341,615 B2                                              Page 1 of 1
APPLICATION NO.    : 10/976119
DATED              : March 11, 2008
INVENTOR(S)        : Robert M. Hardenburg It is certified that error appears in the above-identified patent and that said Letters Patent is hereby corrected as shown below:

On the Title Page, Item (75) Inventor; please delete [Orlon] and insert --Orion--

Column 6; Claim 19; Line 53; please delete [te] and insert --to--

Column 8; Claim 24; Line 30; please delete [arid] and insert --and--

Column 8; Claim 24; Line 31; please insert --a-- before "body"

Column 8; Claim 24; Line 34; please insert --that-- before "abuts"

Column 8; Claim 24; Line 36; please delete [fitter] and insert --filter--

Column 10; Claim 36; Line 39; please delete [(termed] and insert --formed--

Signed and Sealed this

Eighth Day of July, 2008

JON W. DUDAS
*Director of the United States Patent and Trademark Office*